(12) United States Patent
Jibry et al.

(10) Patent No.: US 7,613,975 B2
(45) Date of Patent: Nov. 3, 2009

(54) PREDICTIVE DIAGNOSIS OF A DATA READ SYSTEM

(75) Inventors: Rafel Jibry, Bristol (GB); Peter Arthur Walsh, Somerset (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 473 days.

(21) Appl. No.: 11/217,000

(22) Filed: Aug. 31, 2005

(65) Prior Publication Data

US 2006/0184859 A1 Aug. 17, 2006

(30) Foreign Application Priority Data

Feb. 3, 2005 (GB) .................................. 0502176.1

(51) Int. Cl.
*H04L 1/00* (2006.01)
*G11C 29/00* (2006.01)
*G08C 25/00* (2006.01)
*G06F 11/30* (2006.01)
*G11B 27/36* (2006.01)
*G11B 5/09* (2006.01)
*G11B 11/00* (2006.01)

(52) U.S. Cl. ...................... 714/746; 714/719; 714/799; 360/31; 360/48; 360/53; 702/183; 702/185; 369/53.12; 369/53.15; 369/53.35

(58) Field of Classification Search ................. 714/746, 714/719, 799; 360/31, 48, 53; 702/183, 702/185; 369/53.12, 53.15, 53.35
See application file for complete search history.

(56) References Cited

U.S. PATENT DOCUMENTS

| | | | |
|---|---|---|---|
| 4,506,305 A * | 3/1985 | Cardero | 360/46 |
| 5,761,212 A * | 6/1998 | Foland et al. | 714/719 |
| 6,424,686 B1 * | 7/2002 | Hutchins et al. | 375/341 |
| 6,980,381 B2 * | 12/2005 | Gray et al. | 360/31 |
| 7,050,936 B2 * | 5/2006 | Levy et al. | 702/181 |
| 2006/0023573 A1 * | 2/2006 | Rivera et al. | 369/30.1 |

FOREIGN PATENT DOCUMENTS

EP 1291772 A2 9/2002
JP 001345221 A2 * 9/2003

* cited by examiner

*Primary Examiner*—John J Tabone, Jr.

(57) ABSTRACT

A data read system comprising a read channel for processing a signal, and a diagnostic controller in communication with the read channel. The diagnostic controller is configured to measure at least one metric of the read channel during processing of a signal containing unknown data. The measured metric is then compared against a stored nominal metric and a warning is generated in response to a result of the comparison. In particular, the warning is generated only if the difference between the measured metric and the stored nominal metric exceeds a threshold.

21 Claims, 2 Drawing Sheets

PREDICTIVE DIAGNOSIS OF A DATA READ SYSTEM

FIELD OF THE INVENTION

The present invention relates to a data read system having means for predictively diagnosing potential problems within the system, and to a method of predictively diagnosing a data read system

BACKGROUND OF THE INVENTION

Present data storage devices, such as tape and disk drives, provide limited feedback whenever an error occurs. The feedback is generally broad, indicating only the top-level cause of the error or the general area to which the error relates. For example, a data storage medium may be damaged or be of poor quality and consequently the data storage device may report that the signal-to-noise ratio is too low for the device to reliably read and write to the medium. Without knowing that the medium is damaged or of poor quality, the user might contemplate replacing the storage device. This is particularly true if the same error is reported by the storage device for various types of problems.

Additionally, the feedback provided by data storage devices is reactive and is reported to the user only after the error has occurred. Accordingly, the user is only made aware of the problem at a time when remedial measures are no longer possible.

U.S. Pat. No. 6,249,890 describes a disk drive that includes a controller for predicting future failure of the magneto-resistive head of the drive. The controller measures a characteristic of the head or readback signal and compares the characteristic against a baseline value. As the performance of the head deteriorates, the difference between the measured characteristic and baseline value increases. When the difference between the characteristic and the baseline value exceeds a predetermined threshold, the controller reports that future failure of the head is likely to occur.

Characteristics measured by the controller include the electrical resistance of the head, the nonlinearity of the head, the amplitude of the readback signal and the asymmetry of the readback signal. When measuring the amplitude or asymmetry of the readback signal, the head is positioned over a service track of the disk and reads test data in the form of a constant frequency data pattern. The controller then compares the amplitude or asymmetry of the test readback signal against that the same measurement made during the manufacture of the drive.

The disk drive controller of U.S. Pat. No. 6,249,890 only predicts potential problems with the head of the disk drive. The controller is unable to predict or even diagnose problems with the data medium. Additionally, when measuring the readback signal amplitude and asymmetry, the controller reads known test data stored on a service track of the disk and compares this against measurements made when the drive was manufactured. The controller is therefore dependent upon the same disk being used during the lifetime of the drive. Whilst this arrangement is suitable for fixed-media devices (e.g. hard disks), the controller is unable to predict potential problems for exchangeable-media devices (e.g. tape, CD and DVD drives) based upon readback signal measurements. Furthermore, the controller reports that a future failure of the head is likely when the readback signal amplitude drops below a threshold value. However, the same drop in readback signal amplitude may occur when the head becomes dirty. Accordingly, the user may be advised by the controller to replace the disk drive when the problem may be resolved merely by cleaning the head.

SUMMARY OF THE INVENTION

In a first aspect, the present invention provides a method of diagnosing a data read system comprising a read channel for processing a signal, the method comprising the steps of: measuring at least one metric of the read channel during processing of a signal containing unknown data; comparing the metric against a stored nominal metric; and generating a warning in response to a result of the comparison.

A signal containing unknown data should be understood to mean a signal for which the data read system has no a priori knowledge of the data pattern or sequence contained therein.

Preferably, the stored nominal value corresponds to a metric measurement made when the signal has nominal characteristics.

Advantageously, the warning is generated when the difference between the measured metric and the stored nominal metric exceeds a threshold.

Conveniently, the step of measuring at least one metric comprises measuring a plurality of metrics of the read channel, the step of comparing the metric comprises comparing each metric against a respective stored nominal metric, and the step of generating a warning comprises generating a warning should the difference between at least one metric and the respective stored nominal metric exceed a threshold.

Preferably, the read channel comprises a plurality of components including a decoder and the metric is measured at a point upstream from the decoder.

Advantageously, the read channel comprises a plurality of components including a maximum likelihood detector implementing a soft-output Viterbi algorithm, and the at least one metric includes the output of the soft-output Viterbi algorithm.

Conveniently, the system further comprises a data-read head in communication with the read channel for reading encoded data stored on a data medium and outputting in response a signal.

Preferably, at least one metric varies according to the quality of the data medium upon which the encoded data are stored.

Advantageously, at least one metric varies according to properties of the data-read head.

Conveniently, at least one metric varies according to the separation of the data-read head from the data medium.

Preferably, the system comprises a plurality of read channels, and the step of measuring at least one metric includes measuring at least one metric of each read channel, the step comparing the metric includes comparing the metric of each read channel against a stored nominal metric, and the step of generating a warning includes generating a warning when the difference between the metric of at least one read channel and the stored nominal metric exceeds a threshold.

More preferably, the warning is generated only when the difference between the measured metric of the majority of read channels and the stored nominal metric exceeds the threshold.

Advantageously, the warning includes an indication of a problem or potential problem within the data read system.

Additionally, the warning preferably includes an indication of the severity of the problem or potential problem.

Conveniently, the warning includes possible remedial action.

Preferably, the step of generating a warning includes generating an audible or visual warning.

In a second aspect, the present invention provides a data read system comprising a read channel for processing a signal, and a diagnostic controller in communication with the read channel, wherein the diagnostic controller is configured to perform the method steps described above.

In a third aspect, the present invention provides a data read system comprising a read channel for processing a signal, and a diagnostic controller in communication with the read channel, wherein the diagnostic controller is configured to: measure at least one metric of the read channel during processing of a signal containing unknown data; compare the measured metric against a stored nominal metric; and generate a warning in response to a result of the comparison Preferably, the system comprises a plurality of read channels, and the diagnostic controller is in communication with each read channel and is configured to: measure at least one metric of each read channel during processing of the signal; compare the metric of each read channel against a stored nominal metric; and generate a warning when the difference between the metric of at least one read channel and the stored nominal metric exceeds a threshold.

In a fourth aspect, the present invention provides a data drive comprising the data read system. Preferably, the data drive is a Linear Tape-Open (LTO) tape drive.

In a fifth aspect, the present invention provides means for diagnosing a data read system comprising a read channel for processing a signal, the means comprising: means for measuring at least one metric of the read channel during processing of a signal containing unknown data; means for comparing the metric against a stored nominal metric; and means for generating a warning in response to a result of the comparison.

Advantageously, the computer receives the warning generated by the diagnostic controller and generates in response an audible or visual warning.

Preferably, the computer is in communication with the read channel and the diagnostic controller forms part of the computer.

BRIEF DESCRIPTION OF THE DRAWINGS

In order that the present invention may be more readily understood, embodiments thereof will now be described, by way of example, with reference to the accompanying drawing in which.

DETAILED DESCRIPTION

Figure 1:
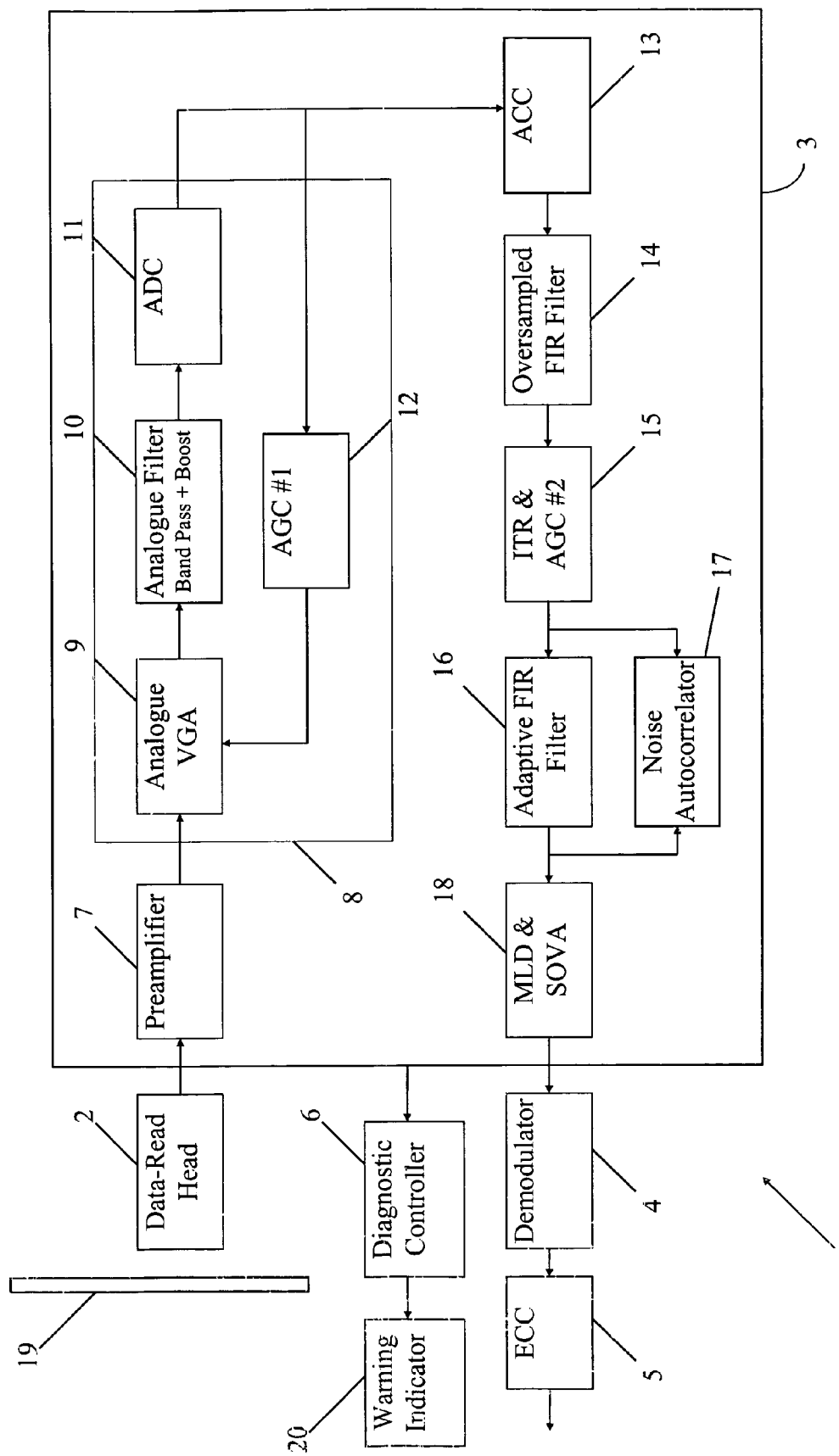
FIG. 1 is a schematic block diagram of a data read system in accordance with the present invention.

The data read system 1 of the present invention and illustrated in FIG. 1 comprises a data-read head 2 for reading encoded data stored on a data medium 19 and outputting in response an analogue readback signal, a read channel 3 for extracting modulated data from the analogue readback signal, a demodulator 4 for demodulating the data, an error correction circuit (ECC) 5 for correcting errors in the demodulated data, a diagnostic controller 6 in communication with the read channel 3, and a warning indicator 20.

The read channel 3 comprises a preamplifier 7 which receives the readback signal from the data-read head 2; an automatic gain control circuit 8 comprising an analogue variable gain amplifier (analogue VGA) 9, an analogue filter 10, an analogue-to-digital converter (ADC) 11 and an automatic gain control (AGC) 12 arranged in feedback between the ADC 11 and the analogue VGA 9; an amplitude asymmetry correction circuit 13; an oversampled FIR filter 14; an interpolated timing recovery circuit (ITR) 15 incorporating a second AGC; an adaptive FIR filter 16; a noise autocorrelator 17; and a maximum likelihood detector (MLD) 18 implementing a soft-output Viterbi algorithm (SOVA).

The components of the read channel 3 are common to conventional read channels and will not therefore be described here in any detail. Indeed, it should be understood that the data read system 1 of the present invention is not limited to the read channel 3 arrangement of FIG. 1, but may instead include any conventional read channel arrangement.

It is perhaps worth noting that the AGC of the ITR 15, which controls the digital gain stage contained in the ITR 15, has a shorter time constant than that of the AGC 12 of the automatic gain control circuit 8. In particular, the time constants of the two AGCs are sufficiently different such that they do not battle each other for control.

In the embodiment of read channel 3 illustrated in FIG. 1, the noise autocorrelator 17 measures the noise autocorrelation (i.e. the noise colour) of the readback signal at the output of the ITR 15 and adaptive FIR filter 16. It will, of course, be apparent that the noise autocorrelation of the readback signal may be measured at additional or alternative nodes of the read channel 3 prior to the MLD 18.

The diagnostic controller 6 is in communication with the read channel 3 so as to measure a metric of one or more of the components of the read channel 3. A metric is a parameter or characteristic based upon components of the read channel 3 that are programmable and/or adaptive and reflects the current characteristics of the readback signal. The metric may be, for example, a variable parameter of a component (e.g. the gain of an amplifier) or a characteristic of the readback signal at the output of a component (e.g. the amplitude asymmetry of the signal).

The diagnostic controller 6 then compares the measured metric against a nominal metric stored within the diagnostic controller 6. The stored nominal metric corresponds to that value or characteristic which the diagnostic controller 6 measures when the data-read head 2 is in good condition (e.g. at the time of manufacture) and the medium 19 on which the encoded data are written is of good quality. When the data-read head is in good condition and the data medium is of good quality, the readback signal received by the read channel 3 will have nominal characteristics, i.e. nominal signal-to-noise, noise colour, signal amplitude etc. When the readback signal has nominal characteristics, the measured metric and stored nominal metric will be the same, or similar within allowed limits.

If a particular metric differs from the corresponding stored nominal metric by a predetermined threshold amount, the diagnostic controller 6 transmits a warning signal to the warning indicator 20, which in turn generates a user warning (e.g. an audible or visual warning). The warning signal generated by the diagnostic controller 6 will depend upon the particular metric (or metrics) that has drifted beyond its threshold amount.

The diagnostic controller 6 preferably stores a look-up table of which warning signal (or signals) to generate in response to a particular (change in one or more of the metrics beyond their respective thresholds.

In a particular embodiment, the diagnostic controller 6 only generates the warning signal if the difference between the metric and stored nominal metric continues to exceed the threshold for a certain period of time. In this manner, temporary fluctuations in the metric beyond its threshold do not trigger a warning.

The diagnostic controller 6 preferably generates at least three types of warning signals. The first warning signal indicates that the data medium 19 is of poor quality, the second warning signal indicates that the data-read head 2 is dirty, and the third warning signal indicates that a potential problem exists with the data-read head 2.

The first type of warning signal generated by the diagnostic controller 6 relates to problems with the data medium 19. There are several metrics of the read channel 2 which the diagnostic controller 6 may measure in order to determine the quality of the data medium 19.

The diagnostic controller 6 may measure the signal-to-noise ratio of the readback signal, preferably at the output of the ITR 15 or the adaptive FIR filter 16. If the signal-noise ratio drops below a threshold value, the diagnostic controller 6 generates the warning signal. Alternatively, or additionally, the diagnostic controller 6 may measure the noise autocorrelation (i.e. the noise colour) of the readback signal, again preferably at the output of the ITR 15 or the adaptive FIR filter 16.

The diagnostic controller 6 may measure the gain of the AGC 12 of the automatic gain control circuit 8. If the gain is running higher than normal, the data medium 19 may be of poor quality. Alternatively, the data-read head 2 may be dirty. Measurement of the gain of the AGC 12 may therefore used in conjunction with another metric data in order to determine whether the high gain of the AGC 12 is the result of poor quality data medium 19 or a dirty data-read head 2.

Where the data-read head 2 is a magneto-resistive head, bumps in the data medium 19 can lead to an increase in temperature of the head 2, resulting in a spike in the readback signal. The read channel 3 may therefore include a thermal asperity detector (not shown) which generates an output signal whenever the readback signal exceeds a threshold value. The diagnostic controller 6 may then monitor the output of the thermal asperity detector and transmit a warning signal should the thermal asperity detector generate an output signal. The diagnostic controller 6 may be configured to transmit the warning signal only after the thermal asperity detector has generated a certain a number of output signals (i.e. only if there is a frequent occurrence of bumps or other imperfections in the data medium 20).

The second type of warning signal generated by the diagnostic controller 6 relates to dirt on the data-read head 2. When the data-read head 2 becomes dirty, the separation of the data-read head 2 from the data medium 19 generally increases resulting in a drop in the readback signal output.

As noted above, the diagnostic controller 6 may measure the gain of the AGC 12 of the automatic gain control circuit 8. A higher than normal gain indicates that the readback signal has a lower amplitude than expected. Whilst this may be caused by dirt on the data-read head 2, it may equally be caused by poor quality data medium 19. Accordingly, the diagnostic controller 6 preferably measures an alternative or additional metric in order to establish whether the data-read head 2 is dirty.

Spacing loss (i.e. the loss in power of the readback signal due to increased separation of the data-read head 2 from the data medium 19) generally leads to the attenuation of the readback signal at high frequencies. The diagnostic controller 6 therefore preferably measure the tap weights of the adaptive FIR filter 16. If the tap weights have drifted from their nominal values beyond their threshold values in a manner which suggests attenuation of the readback signal at high frequencies, the diagnostic controller 6 generates a warning signal that the data-read head 2 is dirty.

The quality of the data-read head 2 may deteriorate with time and usage. The third type of warning signal generated by the diagnostic controller 6 is generated when the data-read head 2 deteriorates to such an extent that performance of the data storage system 1 is impaired or likely to be impaired in the near future.

Where the data-read head 2 is a magneto-resistive head, deterioration of the head 2 may manifest itself as amplitude asymmetry in the readback signal. The diagnostic controller 6 therefore preferably measures the amplitude asymmetry of the readback signal at the output of the ITR 15. If the asymmetry of the readback signal exceeds the stored nominal value by a particular threshold amount, the warning signal is generated.

It will, of course, be appreciated that the diagnostic controller 6 may measure other metrics of the read channel 3 in order to generate the three warning signals listed above, and that the metrics identified above are by no means exhaustive. Additionally, the diagnostic controller 6 may generate additional and/or alternative warning signals. In particular, the warning generated by the diagnostic controller may indicate the degree or severity of the problem within the data read system 1, the probability of the problem developing further, the likelihood of a catastrophic failure of the data read system 1, as well as advice on possible remedial action. For example, the SOVA of the MLD 18 measures the performance margin of the read channel 3, i.e. the probability that the modulated data extracted by the read channel 3 is correct. The diagnostic controller 6 may therefore measure the performance margin of the SOVA. If the performance margin drops below a particular level, the diagnostic controller 6 may issue a warning which includes an indication of the performance margin of the read channel 3.

The data read system 1 may include more than one data-read head 2 and read channel 3. For example, the data read system 1 may be a Linear Tape-Open (LTO) tape drive having eight or sixteen data-read heads 2 and read channels 3. Each read channel 3 of the data read system 1 may include a respective diagnostic controller 6 and warning indicator 20. Alternatively, the data read system 1 may include a single diagnostic controller 6 and warning indicator that are common to, and in communication with, all read channels 3.

The diagnostic controller 6 (or controllers) may be configured to measure and compare corresponding metrics from all read channels 3 of the data read system 1. Certain types of warning signal are then only issued when a particular metric drifts beyond its predetermined threshold for the majority of read channels 3. Indeed, it may be preferable to issue certain types of warning only when the metric drifts beyond its threshold for all read channels 3. For example, the signal-to-noise ratio of a particular read channel 3 may be lower than the nominal metric value suggesting that the data medium 19 is of poor quality. However, a warning signal is preferably issued only if the majority of the read channels 3 demonstrate similar behaviour.

By comparing the corresponding metrics of all read channel 3, the diagnostic controller 3 is able to more accurately determine whether a shift in a metric from its nominal value is the result of the data medium 19 or a particular data-read head 2. For example, if the SOVA performance margin of a particular read channel 2 is much lower than that of the other read channels 3, then the data-read head 2 of that particular read channel 3 would appear to be the cause and a corresponding warning signal may be issued by the diagnostic controller 6. If, however, all read channels 3 suffer from a low performance margin, then the data medium 19 would appear to be at fault.

The data read system 1 is preferably provided as a data drive, such as a tape or disk drive, with the output of the demodulator being fed to a host computer (not shown). The warning indicator 20 may comprise any suitable means for generating an audible or visual warning. For example, the warning indicator 20 may consist of an LED visible to the user which is permanently on when a warning signal of the first type is issued by the diagnostic controller 6, and flash respectively slowly and quickly when a warning signal of the second and third type is issued. By having a data drive that includes both a diagnostic controller 6 and a warning indicator 20, the drive is capable of performing predictive diagnosis and warning the user of any potential problems without any intervention by the host computer.

The data read system 1 may alternatively include a host computer (not shown). In this particular embodiment, the warning indicator 20 forms part of the host computer (e.g. in the form of a computer program), and the diagnostic controller 6 and host computer are provided with communication means, such as input/output ports, for transmitting warning signals from the diagnostic controller 6 to the host computer. The warning indicator 20 preferably generates an on-screen warning on the VDU of the computer whenever a warning signal is received from the diagnostic controller 6.

In a further alternative embodiment, the diagnostic controller 6 also forms part of the host computer (e.g. in the form of a computer program or computer hardware). The read channel 3 and host computer are then provided with communication means for transmitting metric data from the read channel 3 to the host computer.

When the diagnostic controller 6 forms part of the host computer, the host computer preferably logs the metric data received from the read channel 3. Accordingly, when a warning signal is generated by the diagnostic controller 6, a skilled technician may view the logged metric data to more fully analyse the source of the problem. When the diagnostic controller 6 does not form part of the host computer (e.g. if it forms an integral part of the read channel 3), the diagnostic controller 5 may include a memory for logging metric data. The diagnostic controller is then provided with communication means for reading the metric data stored in the memory.

With the data read system 1 of the present invention, predictive diagnosis is provided not only for the data-read head 2 but also for the data medium 20. Moreover, diagnosis is made possible without having to read known data stored on the data medium 20. Accordingly, the data read system 1 is ideally suited for storage devices having exchangeable data media.

Figure 2:
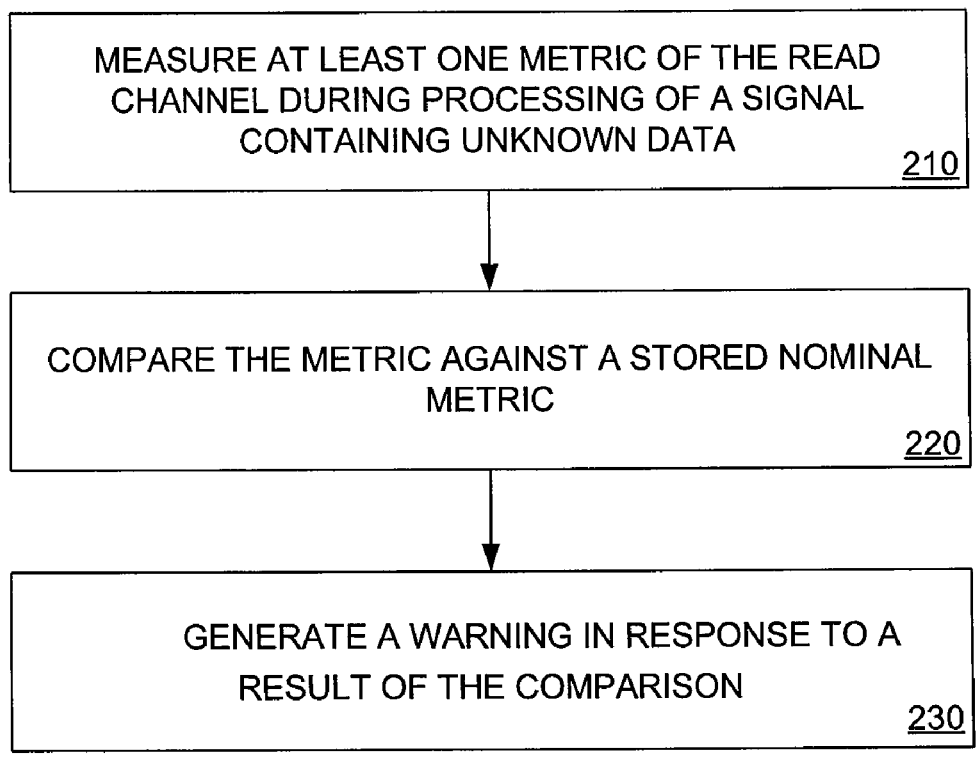
FIG. 2 is a flowchart diagram indicating a method of diagnosing a data read system in accordance with an embodiment of the present invention.

FIG. 2 shows one embodiment of a method of diagnosing a data read system comprising a read channel for processing a signal. The method comprises measuring (210) at least one metric of the read channel during processing of a signal containing unknown data and comparing (220) the metric against a stored nominal metric. The method further comprises generating (230) a warning in response to a result of the comparison.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. A method of diagnosing a data read system comprising a read channel for processing a signal, the method comprising the steps of:
    measuring at least one metric of the read channel during processing of a signal containing unknown data;
    comparing the at least one metric against at least one stored nominal metric;
    diagnosing whether there is a potential problem with the data read system based on the comparison;
    diagnosing whether there is a potential problem with a data medium based on the comparison; and
    generating a warning in response to a result of the comparison.

2. A method according to claim 1, wherein the at least one metric of the read channel is measured during processing of a signal containing a data pattern for which the data read system has no a priori knowledge.

3. A method according to claim 1, wherein the at least one stored nominal value corresponds to a metric measurement made when the signal has nominal characteristics.

4. A method according to claim 1, wherein the warning is generated when the difference between the measured at least one metric and the at least one stored nominal metric exceeds a threshold.

5. A method according to claim 1, wherein the step of measuring the at least one metric comprises measuring a plurality of metrics of the read channel, the step of comparing the at least one metric comprises comparing each metric against a respective stored nominal metric, and the step of generating a warning comprises generating a warning should the difference between at least one metric and the respective stored nominal metric exceed a threshold.

6. A method according to claim 1, wherein the read channel comprises a plurality of components including a decoder and the at least one metric is measured at a point upstream from the decoder.

7. A method according to claim 1, wherein the read channel comprises a plurality of components including a maximum likelihood detector implementing a soft-output Viterbi algorithm, and the at least one metric includes the output of the soft-output Viterbi algorithm.

8. A method according to claim 1, wherein the data read system further comprises a data-read head in communication with the read channel for reading encoded data stored on the data medium and outputting in response a signal.

9. A method according to claim 8, wherein at least one metric varies according to the quality of the data medium upon which the encoded data are stored.

10. A method according to claim 8, wherein at least one metric varies according to properties of the data-read head.

11. A method according to claims 8, wherein at least one metric varies according to the separation of the data-read head from the data medium.

12. A method according to claim 1, wherein the data read system comprises a plurality of read channels, and the step of measuring at least one metric includes measuring at least one metric of each read channel, the step comparing the at least one metric includes comparing the at least one metric of each read channel against at least one stored nominal metric, and the step of generating a warning includes generating a warning when the difference between the at least one metric of at least one read channel and the at least one stored nominal metric exceeds a threshold.

13. A method according to claim 12, wherein the warning is generated only when the difference between the measured at least one metric of the majority of read channels and the stored at least one nominal metric exceeds the threshold.

14. A method according to claim 1, wherein the warning includes an indication of a problem or potential problem within the data read system.

15. A method according to claim 14, wherein the warning includes an indication of the severity of the problem or potential problem.

16. A method according to claim 14, wherein the warning includes possible remedial action.

17. A data read system comprising a read channel for processing a signal, and a diagnostic controller in communication with the read channel, wherein the diagnostic controller is configured to:
- measure at least one metric of the read channel during processing of a signal containing unknown data;
- compare the measured at least one metric against at least one stored nominal metric;
- diagnose whether there is a potential problem with the data read system based on the comparison;
- diagnose whether there is a potential problem with a data medium based on the comparison; and
- generate a warning in response to a result of the comparison.

18. A system according to claim 17, wherein the system comprises a plurality of read channels, and the diagnostic controller is in communication with each read channel and is configured to:
- measure at least one metric of each read channel during processing of the signal;
- compare the metric of each read channel against at least one stored nominal metric;
- diagnose whether there is a potential problem with the data read system based on the comparison of each read channel of a plurality of read channels;
- diagnose whether there is a potential problem with a data medium based on the comparison of each read channel of a plurality of read channels; and
- generate a warning when the difference between the metric of at least one read channel and the stored nominal metric exceeds a threshold.

19. A data drive comprising a system according to claim 17.

20. A data-drive according to claim 19, wherein the data drive is a Linear Tape-Open (LTO) tape drive.

21. Means for diagnosing a data read system comprising a read channel for processing a signal, the means comprising:
- means for measuring at least one metric of the read channel during processing of a signal containing unknown data;
- means for comparing the at least one metric against at least one stored nominal metric;
- means for diagnosing whether there is a potential problem with the data read system based on the comparison;
- means for diagnosing whether there is a potential problem with a data medium based on the comparison; and
- means for generating a warning in response to a result of the comparison.

* * * * *